United States Patent [19]

Lindberg

[11] 4,181,198
[45] Jan. 1, 1980

[54] ENERGY ABSORBER, ESPECIALLY FOR MOTOR VEHICLES

[75] Inventor: Torsten G. Lindberg, Ockero, Sweden

[73] Assignee: AB Volvo, Goteborg, Sweden

[21] Appl. No.: 915,293

[22] Filed: Jun. 13, 1978

[30] Foreign Application Priority Data

Jun. 16, 1977 [SE] Sweden ............................... 7706986

[51] Int. Cl.$^2$ .......................... F16D 7/00; B60R 19/06
[52] U.S. Cl. ...................................... 188/1 C; 293/133
[58] Field of Search ......................... 293/133, DIG. 3; 188/1 C

[56] References Cited

U.S. PATENT DOCUMENTS

| 3,482,653 | 12/1969 | Maki | 293/133 |
| 3,504,568 | 4/1970 | Nakamura | 188/1 C |
| 3,899,047 | 8/1975 | Maeda | 293/133 |
| 3,915,486 | 10/1975 | Maeda | 293/133 |

FOREIGN PATENT DOCUMENTS 7305064  5/1973  Sweden.

Primary Examiner—Robert R. Song
Attorney, Agent, or Firm—Young & Thompson

[57] ABSTRACT

An energy absorber, especially for motor vehicles for e.g. supporting the vehicle bumper, comprises at least two telescopically displaceable tubular members having a common center axis. At least a portion of the length of the outer member has a smaller inner diameter than the outer diameter of at least a portion of the inner member. The two tubular members are designed so that telescopic displacement of the members causes deformation by means of shrinkage of the inner member, while two successive closely spaced bending zones, facing each other, are formed in the material in the inner member. The outer member has an end portion whose inner diameter is equal to the outer diameter of the inner member. The length of said end portion is at least equal to the inner diameter of said outer member.

11 Claims, 6 Drawing Figures

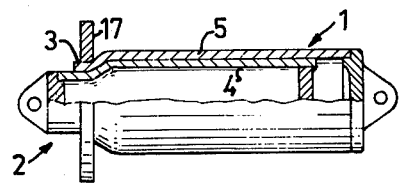
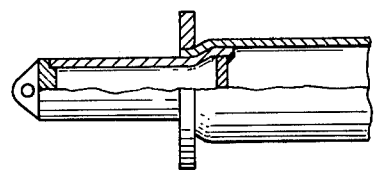
FIG. 4a  FIG. 4b
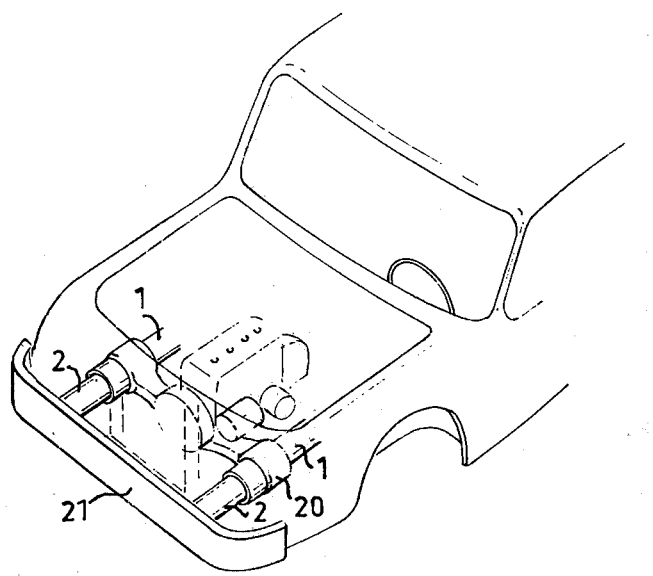
FIG. 5

ENERGY ABSORBER, ESPECIALLY FOR MOTOR VEHICLES

The present invention relates to an energy absorber, especially for motor vehicles for supporting the vehicle bumper, for example, said absorber comprising at least a pair of tubular members having a common centre axis and arranged to be telescopically displaced, at least a portion of the length of the outer member having a smaller inner diameter than the outer diameter of at least a portion of the inner member, said outer member having an inner bevelled surface while the inner member has an outer bevelled surface facing said inner bevelled surface so that telescopic displacement of the members causes deformation of at least one member in the area of said bevelled surfaces.

If damage and/or injury potentialities in traffic collisions between passenger automobiles, for example, are to be kept low, especially as regards the passengers but even as regards the vehicle itself, the vehicle must reduce its speed in an advantageous manner throughout the entire collision sequence. The vehicle is heavily braked during a collision by, for example, an oncoming automobile or a rock-face. The vehicle or the object against which the vehicle collides has a certain movement energy prior to the collision, the magnitude of said movement energy being determined by the speed and weight of the vehicle. During a collision, said energy is converted into deformation of the vehicle. In this event, the product of the deformation length (that is, the compression length) and the mean pressure force (against, for example, a rock-face) plus the developed amount of energy correspond to the movement energy immediately prior to the collision. One must always deal with two factors in collisions, namely the deformation length in the direction of travel and the force against the object one runs into or is run into by.

Generally speaking, the risk for passenger injury is greater if the above-mentioned stopping force is very great as, along with the vehicle, the passenger is also subjected to great forces via the safety belt and by means of being thrown against the windshield, the steering wheel, the dashboard, etc.

On the other hand, very moderate stopping forces increase the risk for bodily injuries due to the vehicle being pressed together a longer distance (for the same collision speed) than in the event of great stopping force, whereby various parts of the automobile, for example the steering wheel, the motor, the pedals etc., can be pushed dangerously far into the coupe.

The stopping forces during the course of the collision can vary in magnitude. This, in turn, gives rise to varying acceleration (positive or negative) in the vehicle. Theoretically and in practice, one can find that certain forms of acceleration/time curves are especially advantageous for the vehicle operator and passengers. Especially desirable force-path diagrams, can, in turn, be traced from said curves. However, the sheet metal body parts of a vehicle alone are insufficiently variable members for making "trimming" possible after optional collision force curves.

An ordinary automobile body cannot simply be assumed to be optimum as regards its ability to provide the most advantageous resistance along the entire deformation stretch in a collision. For example rigid, straight forward side beams (onto whose front ends the bumpers are often mounted) transfer very great forces to the body via the rear, normally curved parts of the beam during the first second of the collision, said rear beam parts thereby breaking apart, so that they immediately thereafter are unable to transfer sufficiently great forces to the rest of the body so that energy absorption at the beginning of the deformation shall be sufficiently great. The weakness of the normal body is that during the first stage of a collision, it quickly loses its ability to receive great forces due to beam collapse during that instant of the collision when great strength is desired.

The ability of a vehicle to offer resistance to a solid barrier, for example, in a head-on collision during different stages of the compression of the vehicle has been measured. It has been found that a normal automobile has a force curve which increases along with the compression length. According to experience (both theoretical and practical), either a continuously high curve (constant force) or a double-peaked curve whose peaks lie rather far apart would be preferred with respect to the security of the passengers.

In order to form the desired force curve, extra energy-absorbing members are required in the construction of the automobile, the properties of said members being adapted to the vehicle in such a manner that the deficiencies of the vehicle, as seen in terms of collisions, are compensated. Attempts have been made in this connection to use energy absorbers in the form of telescopically arranged tubes designed in the manner disclosed in the introduction. Said tubes have been dimensioned so as to achieve deformation of the outer tube by means of stretching when the inner tube is pressed into the outer tube. However, it has been found that these kinds of energy absorbers have poor buckling resistance, which results in the absorbers often breaking apart before any stretching takes place. The problem is that the outer tube cannot be made as rigid as desired, as such a measure would reduce the ability of the tube to be stretched.

In order that the known constructions shall be able to function satisfactorily, they must be supplemented with guides in some form, said guides preventing buckling. However, this in turn results in heavy and space-consuming constructions which are difficult to put to practical use.

The purpose of the present invention is to eliminate said problem and achieve an energy absorber which, without requiring outer guides, substantially reduces buckling risk.

According to the invention, this is achieved by means of the two tubular members being constructed so that deformation essentially takes place by means of shrinkage of the inner member while two successive closely spaced bending zones which face each other are formed in the material in the inner member, and by means of the outer member having an end portion whose inner diameter is equal to the outer diameter of the inner member, the length of said end portion being at least equal to its inner diameter.

By means of constructing the outer tube in such a rigid manner, great buckling resistance is obtained. It has been found that said end portion serves as an effective guide for the inner tube in order to reduce the risk for buckling of the same if the disclosed length-diameter relationship is not fallen short of. This has been found to be a minimum in order to obtain a satisfactory result. Buckling security can be improved further if the end portion functioning as a guide is elongated further. An optimum is achieved when the length is approximately one and a half times as large as the diameter.

The invention shall be described in more detail below. Reference is made to the embodiment shown in the enclosed drawings.

FIGS. 4a and 4b show a longitudinal section through a device especially intended for traction force.

FIG. 5 is a schematic, perspective view of the forward end of a passenger automobile body, illustrating an application of the invention.

Figure 1:
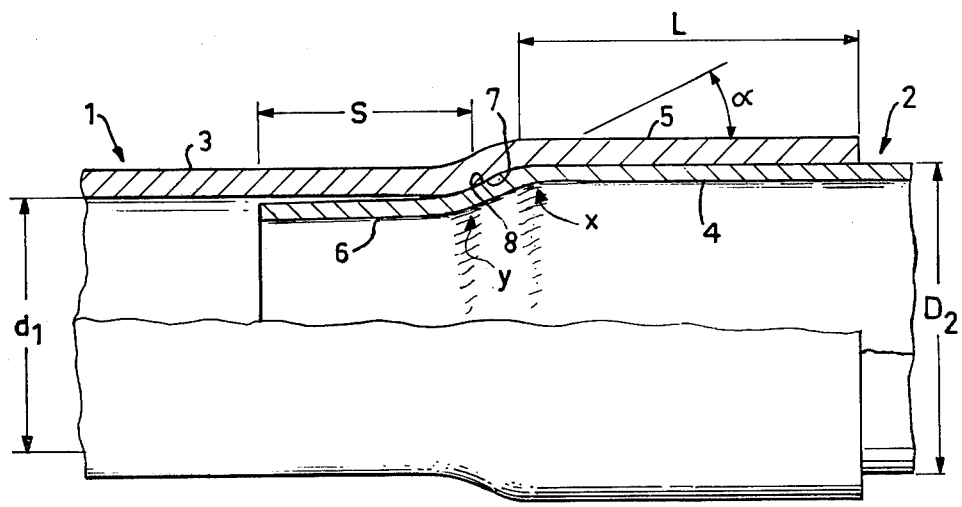
FIG. 1 shows a cross-section of an embodiment of the energy absorber illustrating the functional principle.

The energy absorber shown in FIG. 1 consists of an outer tube 1 and an inner tube 2. The tube 1 has a main portion 3 having an inner diameter $d_1$, while the tube 2 has a main portion 4 having an outer diameter $D_2$ which is greater than the inner diameter $d_1$ of the tube 1. Furthermore, the tube 1 has an end portion 5 whose inner diameter is equal to the outer diameter $D_2$ of the tube 2 and which serves as a guide for the tube 2. The length L of the portion 5 shall, according to the invention, be at least equal to the inner diameter $D_2$ of the portion and L shall preferably be equal to 1.5 $D_2$ if space allows. In the embodiment shown in FIG. 1, the starting position of the tubes is with the left-hand end of the tube 2 lying at the right-hand end of the main portion 3 of the tube 1, and the tube 2 has consequently been compressed the distance S, shrinking and absorbing energy. Naturally, the tubes have the position shown in FIG. 1 as the starting position in the built-in state, whereby the shrunk portion 6 of the tube 2 also serves as a guide.

In FIG. 1 it is assumed that the tubes 1 and 2 consist of the same material. In order to ensure that only the tube 2 is deformed during compression, said tube has a smaller wall thickness than the tube 1. That which is characteristic for the function is that the tube 2 is bent forwards and backwards in two bending zones x and y. As the bends are "sharp" and close together, plastic working of the material in the tube 2 arises. After the bending in zone y, the tube 2 will, as is indicated in FIG. 1, leave the inner wall of the tube 1 or at least not press hard against the same. The frictional force between the tubes along the distance S will be practically 0. In other words, no new compression resistance increasing with increasing distance S will be formed. Thus, the compression resistance only originates from the deformation work in the two bending zones x and y, which is constant while zones x and y move along the tube 1, as long as that part of the tube 2 which extends into the tube 1 has a constant diameter.

Beyond the strength properties of the tube 2 and the difference between diameters $D_2$ and $d_1$, the compression resistance also depends on the angle $\alpha$ of the bevelled surfaces 7 and 8 formed at the conversion between portions 3 and 5 of the tube 1, and portions 4 and 6 of the tube 2. Resistance increases as angle $\alpha$ increases. Said resistance can be raised so much that the tubes are broken outside of the working zones as well. In order to increase buckling strength to extreme values, the tubes can be filled with plastic foam.

Figure 2:
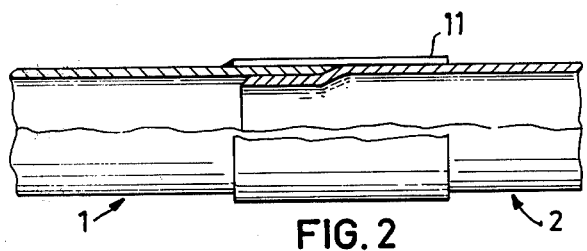
FIG. 2 shows a longitudinal section of an embodiment in which one of the members is reinforced.

In FIG. 2 a third, shorter tube 11 is pressed as a sleeve over the working area of the tube 1. Said sleeve does not move relative the tube 1 when the tube 2 is pressed into the tube 1. Thus, it also serves as a guide against buckling. Thus, said embodiment of the energy absorber is complete and can also be used without any outer auxiliary guides.

Torsional rigidity can be obtained by the tubes 1 and 2 being connected to each other by means of a few short welds (not shown). Said welds are dimensioned on the basis of maximum desired transferred torque and maximum allowed force impact at the beginning of the compression of the tubes in, for example, a collision, as the force required to shear off the welds is superposed the force required to deform the tube 2. A device with welds can, furthermore, transfer tractive forces.

Figure 3:
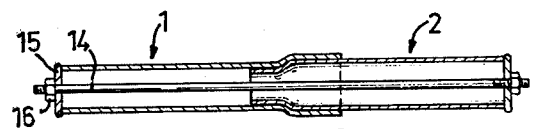
FIG. 3 shows a longitudinal section of an embodiment intended to absorb traction loads.

An embodiment especially intended for absorbing tractive forces is shown in FIG. 3. A rod 14 whose ends are threaded extends through both of the tubes. Plates 15 and nuts 16 at the ends of the tubes hold the rod 14 in place.

The described embodiments of the energy absorber according to the invention can absorb great amounts of energy in relation to their weight. Two standard tubes of steel having a diameter of 70 mm and a material thickness of 2 mm must, for example, be loaded with a force of approximately 120,000 N in order to be displaced telescopically. This has been measured at compression speeds as high as 50 kilometers per hour.

The energy absorber according to the invention has been described above with reference to embodiments which are especially intended to absorb energy during pressure load. However, in some cases it can be desirable to arrange an energy absorber for absorption of energy under tractive load. An example of such an arrangement is shown in FIG. 4a prior to and FIG. 4b after the inner tube 2 has been pulled out. Functionally, said arrangement does not differ from the devices described above. The embodiment for tractive load differs in construction from the pressure load devices in that the outer tube 1 has a short portion 3 having an inner diameter $d_1$, the larger part of said tube being formed of a portion 5 having an inner diameter $D_2$, which contains portion 4 of tube 2. A reinforcement ring 17 is arranged around the working area of the tube 1.

Finally, FIG. 5 illustrates an application of the invention in which two energy absorbers are mounted on and partially constitute forward side beams in a passenger automobile body. A motor-carrying beam 20 and forward vehicle section (not shown) are mounted onto the outer tubes 1 which are stationary, while the inner tubes 2 support the bumper 21. In the event of a collision at a moderate speed, the tubes 1 are subjected to minimal damage or no damage at all, while the tubes 2 are "used up." Injury to both the passengers as well as the automobile itself is reduced due to the energy absorber's even force curve without peaks which could deform inner parts of the body. Repairs are inexpensive as the tubes 2 are easily removed and replaced by new ones.

The rear bumper of the vehicle can, in a corresponding manner, be mounted onto two energy absorbers which either wholly or partially constitute rear side beams, whereby force load-relieving can be effected against, for example, the rear axle or the differential housing.

What I claim is:

1. An energy absorber, especially for motor vehicles for supporting the vehicle bumper, for example, said absorber comprising at least a pair of tubular members (1,2) having a common centre axis and arranged to be telescopically displaced, at least a portion (3) of the length of the outer member (1) having a smaller inner diameter ($d_1$) than the outer diameter ($D_2$) of at least a portion (4) of the inner member, said outer member having an inner bevelled surface (7) while the inner member has an outer bevelled surface (8) facing said inner bevelled surface so that telescopic displacement of the members causes deformation of at least one member in the area of said bevelled surfaces, characterized in that the two tubular members (1,2) are designed so that deformation substantially takes place by means of shrinkage of the inner member (2) while two successive closely spaced bending zones (x,y) which face each other are formed in the material in the inner member, and in that the outer member (1) has an end portion (5;11) whose inner diameter is equal to the outer diameter ($D_2$) of the inner member, the length (L) of said end portion being at least equal to the inner diameter ($D_2$) of said outer member.

2. An energy absorber according to claim 1, characterized in that the length (L) of the end portion (5;11) is approximately 1.5 times the inner diameter ($D_2$).

3. An energy absorber according to claim 1 or 2, characterized in that the tubular members (1,2) have the same material thickness, the inner member consisting of a softer material than the outer member.

4. An energy absorber according to claim 1 or 2, characterized in that the tubular members (1,2) consist of the same material, the inner member having a lesser material thickness than the outer member.

5. An energy absorber according to claim 1 or 2, characterized in that the tubular members (1,2) consist of the same material and have the same material thickness, the bevelled surface (7) area of the outer member (1) having an outer reinforcement ring (11).

6. An energy absorber according to claim 5, characterized in that the outer reinforcement ring (11) is formed of a separate sleeve.

7. An energy absorber according to any one of claim 1, characterized in that one of the end surfaces of the inner tubular member (2) is obliquely bevelled and forms said bevelled surface.

8. An energy absorber according to any one of claim 1, characterized in that the inner tubular member (2) has a portion (6) having a reduced diameter which projects into the outer member (1), the bevelled surface (8) of the inner member being formed at the conversion between the portion having reduced diameter and the adjacent portion (4) of said member.

9. An energy absorber according to any one of claim 1, characterized in that a drawing rod (14) extends through the tubular members (1,2) and is connected to the ends of the members which are facing away from each other.

10. An energy absorber according to any one of claim 1, characterized in that it is arranged to resist a pressing force, the greater portion of the inner member (2) being situated outside of the outer member (1) in the initial position.

11. An energy absorber according to any one of claim 1, characterized in that it is arranged to resist a tractive force, the greater portion of the inner member (2) being situated inside the outer member (1) in the initial position.

* * * * *